Aug. 8, 1961 C. S. WEBBER ET AL 2,995,467
ADHESIVE TAPES AND LINERS HAVING RELEASE COATINGS OF
REACTION PRODUCTS OF EPOXY POLYESTER OF LONG-CHAIN
SATURATED ALIPHATIC ACIDS AND CERTAIN
AMINE-ALDEHYDE THERMOSETTING RESINS
Filed Feb. 6, 1959
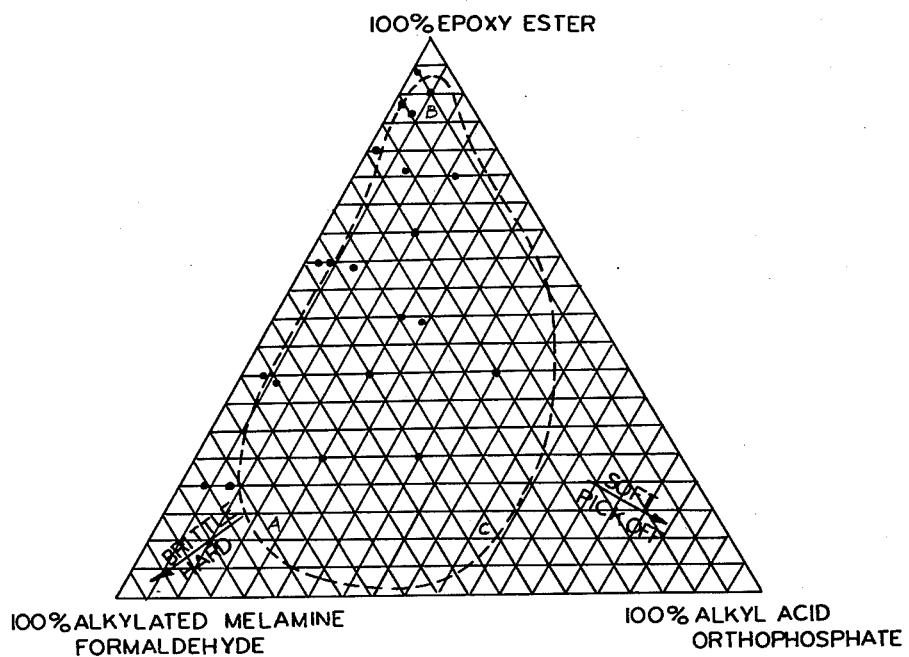
INVENTORS
CHARLES S. WEBBER
ELISHA B. LEWIS
BY *Rufus M. Franklin*
ATTORNEY United States Patent Office 2,995,467
Patented Aug. 8, 1961

2,995,467
ADHESIVE TAPES AND LINERS HAVING RELEASE COATINGS OF REACTION PRODUCTS OF EPOXY POLYESTER OF LONG-CHAIN SATURATED ALIPHATIC ACIDS AND CERTAIN AMINE-ALDEHYDE THERMOSETTING RESINS
Charles S. Webber, Loudonville, and Elisha B. Lewis, Schenectady, N.Y., assignors to Norton Company, Troy, N.Y., a corporation of Massachusetts
Filed Feb. 6, 1959, Ser. No. 791,655
4 Claims. (Cl. 117—68)

This invention relates to a novel coating composition which is particularly useful as a combination backsize and release coat for fibrous pressure sensitive adhesive tapes. The invention is generally useful in any application in which quick release of a rubber-based pressure sensitive adhesive from a surface is desired and provides both a protective and solvent resistant film and a surface providing excellent release characteristics.

In order to produce satisfactory masking tapes and other types of pressure sensitive adhesive tapes having a paper backing, it is necessary to guard or strengthen the paper backing against delamination forces produced when the pressure sensitive adhesive coated side of the tape is pulled away from the back surface of an adjacent convolution when unwinding a roll of the tape. It is standard practice in the tape art to impregnate the paper to increase its internal strength to resist such delamaination. It is a further practice to apply a solvent resistant and strengthening backsize to the side opposite that which receives the adhesive coating, and to apply a release agent to the backsize to decrease the adhesion of the pressure sensitive adhesive to the surface. The properties required in a satisfactory release agent are described in U.S. Patent 2,822,290 to C. S. Webber.

The novel compositions of our invention provide a coating material which performs both the function of a backsize and a release coating efficiently without the necessity of two separate coatings or the inclusion of an additional release component in the backsize as is required with many of the tape constructions of the prior art.

It is an object of our invention to provide a novel combined backsize and release agent for application to the back of pressure sensitive adhesive tapes, the liner for double-faced adhesive tapes, or to any surface from which quick and relatively free release of a pressure sensitive adhesive is desired.

It is a further object of our invention to provide a novel adhesive tape incorporating our improved combination backsize and release coat.

The compositions which we have found useful to accomplish the objects of our invention are reaction products of epoxy polyesters of long chain saturated aliphatic acids, and certain amine-aldehyde thermosetting resins. The reaction is catalyzed by the inclusion of acidic materials which do not result in deleterious action on the tape backings due to too high an acidity in the finished product such as phosphorous acid, hypophosphorous acid, alkyl acid phosphates, etc.

In the drawing the figure is a triangular coordinate graph indicating within the dotted line the area representing operative amounts of the several ingredients in an embodiment of our invention.

In order to form the epoxy polyester which is one ingredient of our novel composition we utilize epoxy-polyfunctional phenol resins which are reaction products of polynuclear, polyfunctional phenols with epihalohydrins. Such polymers are described in U. S. Patents 2,512,996; 2,444,333; 2,528,417; and 2,456,408, and may be purchased from the Shell Chemical Corporation under the trademark "Epon."

In order to form the polyesters required in our invention we react suitable epoxy compounds with aliphatic acids containing carbon chains of 16 or more carbon atoms and preferably 18 to 22 carbon atoms or more. The epoxy resins found suitable have an epoxide equivalent of from 225 to 2400. Suitable resins obtainable commercially are Shell Epons 834, 864, 1001, 1004, 1007, and 1009. The expoxide resin is heated with the fatty acid in an inert atmosphere at 150° C. to 250° C. until the acid number has been reduced to about ten or less. In general we use about two mols of fatty acid per epoxide equivalent.

As the amine-aldehyde ingredient of our invention alkylated melamine formaldehyde resins are preferred because of their excellent moisture resistance; however, alkylated urea-formaldehyde resins function very satisfactorily except at long exposure to high humidity and temperature.

Although, in general, any hydrogen ion source, dispersible by the solvents used is suitable in our invention as the catalyst, lauryl acid orthophosphate or other alkyl acid phosphates having long chain alkyl groups to enhance the release characteristics of the cured film are preferable.

Illustrative of the epoxy esters useful in our invention is a behenic acid ester of Shell Epon 1004. To produce this polyester 148.5 pounds of the powdered epoxy resin are mixed with 106.7 pounds of behenic acid. The mixture is heated to a maximum of 250° C. and stirred, while in an inert atmosphere until the acid number drops to about 0.5 or less. About 9 hours at 240 to 250° C. is required. The product is a viscous brown resinous fluid at room temperature.

A stearic acid polyester may be similarly prepared by reacting 159.6 pounds of Shell Epon 1004 with 95.1 pounds of stearic acid. About 8 hours at 240° to 250° C. is required to bring the acid number to about 0.5 or less.

The stearic or behenic acid polyesters such as described above may be mixed with the amine-aldehyde resin and the hydrogen ion source in the presence of a mutual solvent and applied to the tape or other surface and cured in situ. We have found that toluene is a suitable solvent and that a total solids content of around 30% is satisfactory. Obviously the total solids content may vary widely depending upon the particular coating apparatus used and the surface to be coated.

The following are examples of suitable compositions according to our invention:

*Example I*

| | Parts by weight based on total solids |
|---|---|
| Stearic acid modified epoxy resin | 50 |
| A heat advancing butylated melamine formaldehyde resin ("Uformite" M-55 from Rohm & Haas, Philadelphia, Pa.) | 30 |
| Lauryl acid orthophosphate | 20 |

*Example II*

| | |
|---|---|
| Behenic acid modified epoxy resin | 50 |
| A heat advancing butylated melamine formaldehyde resin ("Uformite" M-55) | 30 |
| Lauryl acid orthophosphate | 20 |

*Example III*

| | |
|---|---|
| Behenic acid modified epoxy resin | 76 |
| A heat advancing butylated melamine formaldehyde resin ("Uformite" M-55) | 16 |
| Lauryl acid orthophosphate | 4 |
| Phosphorous acid | 4 |

Example IV

| | Parts by weight based on total solids |
|---|---|
| Stearic acid modified epoxy resin | 50 |
| Heat advancing alkylated urea-formaldehyde resin ("Uformite" F-233) | 30 |
| Lauryl acid orthophosphate | 20 |

Example V

| | |
|---|---|
| Behenic acid modified epoxy resin | 50 |
| Heat advancing butylated urea-formaldehyde resin ("Uformite" F-200 E) | 30 |
| Lauryl acid orthophosphate | 20 |

The triangular coordinate diagram in the drawing illustrates, generally, the operative limits of the invention. The points inside dotted line A—B—C all represent operative proportions of the epoxy ester, melamine-formaldehyde resin, and the alkyl orthophosphate. In preparing this diagram, the epoxy ester used was a stearic acid ester of Shell Epon 1004, the alkylated melamine-formaldehyde was "Uformite" M-55 and the acid was lauryl acid orthophosphate. In cases where less than 5% of the lauryl acid orthophosphate was used it was found necessary to introduce 4% phosphorous acid to insure effective cure.

Although the diagram in the drawing was prepared for the above noted specific ingredients, it shows in general the range of proportions of ingredients which are operative in our invention. For example, where greater than about 75% of the amine-formaldehyde resin is employed, the resultant coating is excessively brittle and hard. Where greater than about 55% of the alkyl acid orthophosphate is employed the product is excessively soft and is picked off of the backing by the pressure sensitive adhesive.

A satisfactory cure of the combined release coating and backsize is achieved by curing for about 20 minutes at about 300° F. Curing may also be accomplished at a lower temperature such as 250° F. for a longer period of time.

Although we have suggested a preferred ratio of approximately two mols of higher fatty acid for each epoxide equivalent, when epoxy resins having lower epoxide equivalents are used, it may be found desirable to decrease the amount of fatty acid employed to less than two mols per epoxide equivalent.

Although our invention is particularly useful in connection with tapes having a backing of low internal strength and therefore subject to delamination, or in connection with tapes having a very aggressive adhesive which tends to delaminate even strong fibrous backings, the invention is not limited to any particular tape or liner, but is applicable to a wide variety of tapes made with pressure sensitive adhesive.

Any of the usual pressure sensitive adhesive compositions known to the prior art may be used. By "pressure sensitive" is meant an adhesive which is normally and aggressively tacky, more cohesive than adhesive, and which has a four-fold balance of adhesion, cohesion, stretchiness and elasticity. The most common types are the so-called rubber resin adhesives in which natural or synthetic rubbers or mixtures thereof are modified with a tackifier resin (ester gum, rosin, etc.) in a proportion adapted to impart the necessary tack and cohesive properties. Examples of such adhesives as well as other types of pressure sensitive adhesives which may be used in formulating tapes for use with the present invention are given in U.S. 2,156,380; 2,177,627; 2,319,959; and 2,553,816. In some cases it may be desirable to include a release agent in the adhesive mass such as disclosed in U.S. Patent 2,646,371.

These release backsizes may be further modified by the inclusion of dyes, pigments, fillers, thickening agents, diluents, organic solvents, resins such as phenol-aldehyde resins, plasticizers, etc. to modify color, viscosity, drying, penetration, melting point, hardness, flexibility, release pick off, moisture resistance, heat resistance, aging characteristics, tensile, elongation and the like as required in the art but are still considered within the scope of the patent.

We claim:
1. A normally tacky and pressure sensitive adhesive tape comprising a flexible backing, a normally tacky pressure sensitive adhesive coating firmly bonded to one surface of said backing, a combined backsize and release coating firmly bonded to the opposite face of said backing, said combined backsize and release coating being an in situ heat cured flexible film consisting essentially of the reaction product of a mixture of (1) a long chain fatty acid polyester of an epoxy-polyfunctional phenolic resin having an epoxide equivalent of from about 225 to 2400, said long chain fatty acid being a saturated acid with a chain length of at least 16 carbon atoms, (2) a resin selected from the group consisting of alkylated melamine formaldehyde resins and alkylated urea formaldehyde resins, and (3) an acidic catalyst compatible and mutually soluble with said resins said ingredients (1), (2) and (3) being present in amounts equivalent to the range of composition indicated within the area A—B—C on the accompanying drawing.

2. An article as in claim 1 wherein said acidic catalyst is a mixture of a long chain alkyl acid orthophosphate and an acid selected from the group consisting of phosphorous acid and hypophosphorous acid.

3. An article according to claim 1 wherein said acidic catalyst is a long chain alkyl acid orthophosphate.

4. A liner for double faced pressure sensitive adhesive tape comprising a fibrous web having a coating on both sides thereof consisting of the reaction product of a mixture of (1) a long chain fatty acid polyester of an epoxy-polyfunctional phenolic resin having an epoxide equivalent of from about 225 to 2400, said long chain fatty acid being a saturated acid with a chain length of at least 16 carbon atoms, (2) a resin selected from the group consisting of alkylated melamine formaldehyde resins and alkylated urea formaldehyde resins, and (3) an acid catalyst compatible and mutually soluble with said resins, said ingredients (1), (2) and (3) being present in amounts equivalent to the range of composition indicated within the area A—B—C on the accompanying drawing.

References Cited in the file of this patent

UNITED STATES PATENTS

| | | |
|---|---|---|
| 2,541,975 | Bird | Feb. 20, 1951 |
| 2,548,980 | Kellgren | Apr. 17, 1951 |
| 2,637,621 | Auer | May 5, 1951 |
| 2,651,408 | Engberg et al. | Sept. 8, 1953 |
| 2,681,322 | Auer | June 15, 1954 |
| 2,686,771 | Whitehill et al. | Aug. 17, 1954 |
| 2,703,765 | Osdal | Mar. 8, 1955 |
| 2,822,290 | Webber | Feb. 4, 1958 |
| 2,862,613 | Klemka et al. | Dec. 2, 1958 |
| 2,880,862 | Sermattei | Apr. 7, 1959 |

FOREIGN PATENTS

| | | |
|---|---|---|
| 642,306 | Great Britain | Aug. 30, 1950 |

OTHER REFERENCES

Noller: Textbook of Organic Chemistry, pages 152–153, Saunders, London, 1951.